United States Patent
Cooper (10) Patent No.: US 7,215,365 B2
(45) Date of Patent: May 8, 2007

(54) SYSTEM AND METHOD FOR EFFECTIVELY CALCULATING DESTINATION PIXELS IN AN IMAGE DATA PROCESSING PROCEDURE

(75) Inventor: Ted. J Cooper, Sunnyvale, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1041 days.

(21) Appl. No.: 10/170,740

(22) Filed: Jun. 13, 2002

(65) Prior Publication Data

US 2002/0196350 A1  Dec. 26, 2002

Related U.S. Application Data

(60) Provisional application No. 60/301,173, filed on Jun. 25, 2001.

(51) Int. Cl.
 *H04N 9/73* (2006.01)
 *H04N 5/235* (2006.01)
 *G06K 9/40* (2006.01)

(52) U.S. Cl. .............................. 348/223.1; 348/222.1; 382/254

(58) Field of Classification Search ............. 348/223.1, 348/230.1
See application file for complete search history.

(56) References Cited

U.S. PATENT DOCUMENTS

| | | | | |
|---|---|---|---|---|
| 6,151,136 A | * | 11/2000 | Takemoto | .................... 358/1.9 |
| 6,788,813 B2 | * | 9/2004 | Cooper | ....................... 382/167 |
| 2002/0021360 A1 | * | 2/2002 | Takemoto | .................... 348/222 |
| 2002/0140825 A1 | * | 10/2002 | Terashita | .................. 348/222.1 |

\* cited by examiner

*Primary Examiner*—Vivek Srivastava
*Assistant Examiner*—Kelly Jerabek
(74) *Attorney, Agent, or Firm*—Gregory J. Koerner; Redwood Patent Law (57) ABSTRACT

A system and method for effectively performing an image data processing procedure may include an image manager configured to access raw image data and responsively process the raw image data to produce final image data. The image manager may preferably perform a series of destination pixel calculations with raw image data pixels from the raw image data to generate final image pixels for the final image data. While performing the foregoing image data processing procedure, the image manager may utilize various enhancements techniques, including a dual-spiral processing pattern, a distance weighting factor, a reset relaxation technique, an iteration limit, a ratio-array technique, and an image blending technique.

42 Claims, 8 Drawing Sheets

SYSTEM AND METHOD FOR EFFECTIVELY CALCULATING DESTINATION PIXELS IN AN IMAGE DATA PROCESSING PROCEDURE

CROSS-REFERENCE TO RELATED APPLICATIONS

This application relates to, and claims priority in, U.S. Provisional Patent Application Ser. No. 60/301,173, entitled "Retinex Algorithm Extensions Using Path Length Weighting, Segmentation, And Image Combination," that was filed on Jun. 25, 2001. The foregoing related application is commonly assigned, and is hereby incorporated by reference.

BACKGROUND SECTION

1. Field of the Invention

This invention relates generally to techniques for manipulating data, and relates more particularly to a system and method for effectively performing an image data processing procedure.

2. Description of the Background Art

Implementing effective methods for manipulating data is a significant consideration for designers and manufacturers of contemporary electronic devices. However, effectively manipulating data with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures and manipulates digital image data may benefit from an effective implementation because of the large amount and complexity of the digital data involved.

Due to growing demands on system resources and substantially increasing data magnitudes, it is apparent that developing new techniques for manipulating data is a matter of concern for related electronic technologies. Therefore, for all the foregoing reasons, developing effective systems for manipulating data remains a significant consideration for designers, manufacturers, and users of contemporary electronic devices.

SUMMARY

In accordance with the present invention, a system and method are disclosed for effectively performing an image data processing procedure. In one embodiment, initially, a camera device or other appropriate entity may preferably capture raw image data by utilizing any appropriate means or techniques. In certain embodiments, a white balancing process may previously or concurrently be performed by the camera device.

Then, an image manager may preferably convert the captured raw image data into logarithmic format to facilitate mathematical calculations during the image data processing procedure. Next, the image manager may preferably calculate a ratio array based upon color characteristics between respective color channels of the captured raw image data. In certain embodiments, a segmentation procedure may concurrently be performed by image manager.

In accordance with the present invention, the image manager may next preferably perform a specified number of processing iterations on the captured raw image data (in logarithmic format) to thereby generate intermediate image data by utilizing any appropriate techniques. For example, the image manager may perform a sequential series of destination pixel calculations for each respective pixel from the raw image data to produce an individual processing iteration. In certain embodiments, the image manager may utilize various enhanced techniques to optimize the destination pixel calculation procedure, including a dual-spiral processing technique, a distance weighting factor, a relaxed reset technique, and a fixed iteration limit.

Next, the image manager may preferably utilize the previously-calculated ratio array to adjust color characteristics of the intermediate image data based upon corresponding color characteristics of the raw image data, to thereby generate processed image data. Then, the image manager may preferably calculate the anti-log of the processed image data to reverse the prior conversion to logarithmic format.

A system user, the image manager, or any other appropriate entity may preferably select a best iteration of the processed image data (in non-logarithmic format) by utilizing any effective means to thereby produce optimal processed image data. Finally, the image manager may preferably perform a blending procedure to blend the foregoing optimal processed image data with the raw image data to thereby produce final image data. The present invention thus provides an improved system and method for effectively performing an image data processing procedure.

DETAILED DESCRIPTION

The present invention relates to an improvement in data processing techniques. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively performing an image data processing procedure, and may preferably include an image manager configured to access raw image data and responsively process the raw image data to produce final image data. The image manager may preferably perform a series of destination pixel calculations with raw image data pixels from the raw image data to generate final image pixels for the final image data. While performing the foregoing image data processing procedure, the image manager may utilize various processing enhancements techniques, including a dual-spiral processing pattern, a distance weighting factor, a reset relaxation technique, an iteration limit, a ratio-array technique, and an image blending technique.

Figure 1:
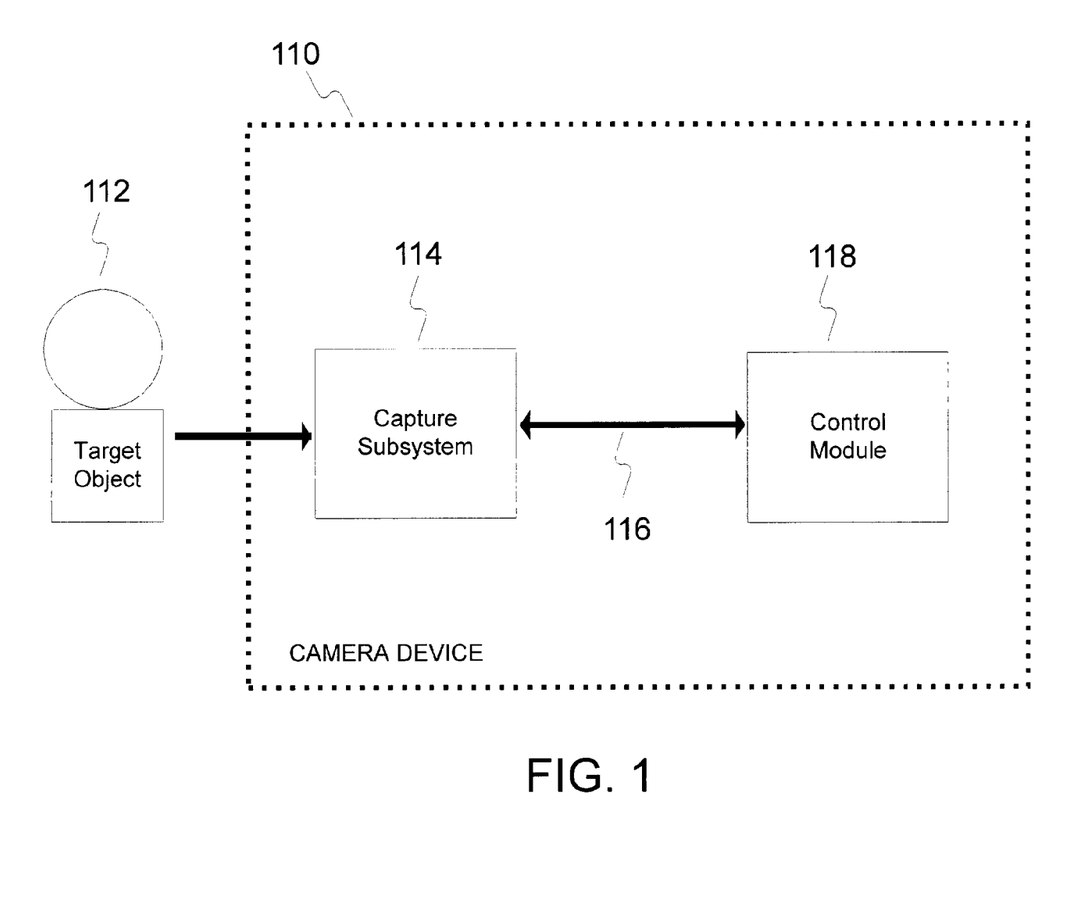
FIG. 1 is a block diagram for one embodiment of a camera device, in accordance with the present invention.

Referring now to FIG. 1, a block diagram for one embodiment of a camera device 110 is shown, in accordance with the present invention. In the FIG. 1 embodiment, camera device 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, camera device 110 may readily include various other components in addition to, or instead of, those components discussed in conjunction with the FIG. 1 embodiment. In addition, in certain embodiments, the present invention may alternately be embodied in any appropriate type of electronic device other than the camera device 110 of FIG. 1. For example, camera device 110 may readily be implemented as a scanner device, a video camera device, or a computer device.

In the FIG. 1 embodiment, once a system user has focused capture subsystem 114 on target object 112 and requested camera device 110 to capture image data corresponding to target object 112, then control module 118 may preferably instruct capture subsystem 114 via system bus 116 to capture image data representing target object 112. The captured image data may then be transferred over system bus 116 to control module 118, which may responsively perform various processes and functions with the image data. System bus 116 may also bi-directionally pass various status and control signals between capture subsystem 114 and control module 118.

Figure 2:
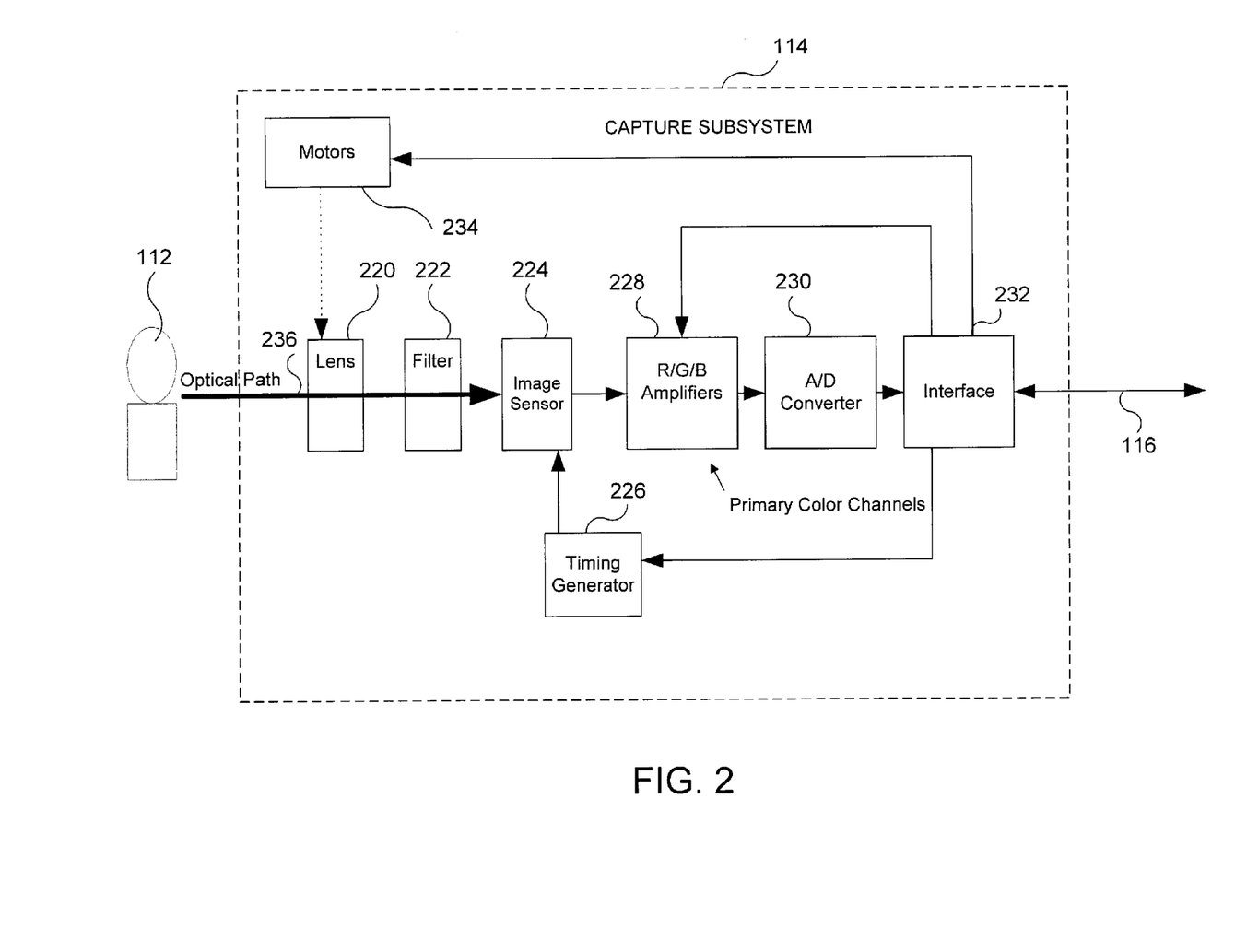
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, imaging device 114 preferably comprises, but is not limited to, a lens 220 having an iris (not shown), a filter 222, an image sensor 224, a timing generator 226, red, green, and blue amplifiers 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture image data corresponding to target object 112 via reflected light impacting image sensor 224 along optical path 236. Image sensor 224, which may preferably include a charged-coupled device (CCD), may responsively generate a set of image data representing the target object 112. The image data may then be routed through red, green, and blue amplifiers 228, A/D converter 230, and interface 232. Interface 232 may preferably include separate interfaces for controlling ASP 228, motors 234, timing generator 226, and red, green, and blue amplifiers 228. From interface 232, the image data passes over system bus 116 to control module 118 for appropriate processing and storage. Other types of image capture sensors, such as CMOS or linear arrays are also contemplated for capturing image data in conjunction with the present invention. Additionally contemplated are implementations such as CMYG data capture configurations where more that three primary colors are utilized.

Figure 3:
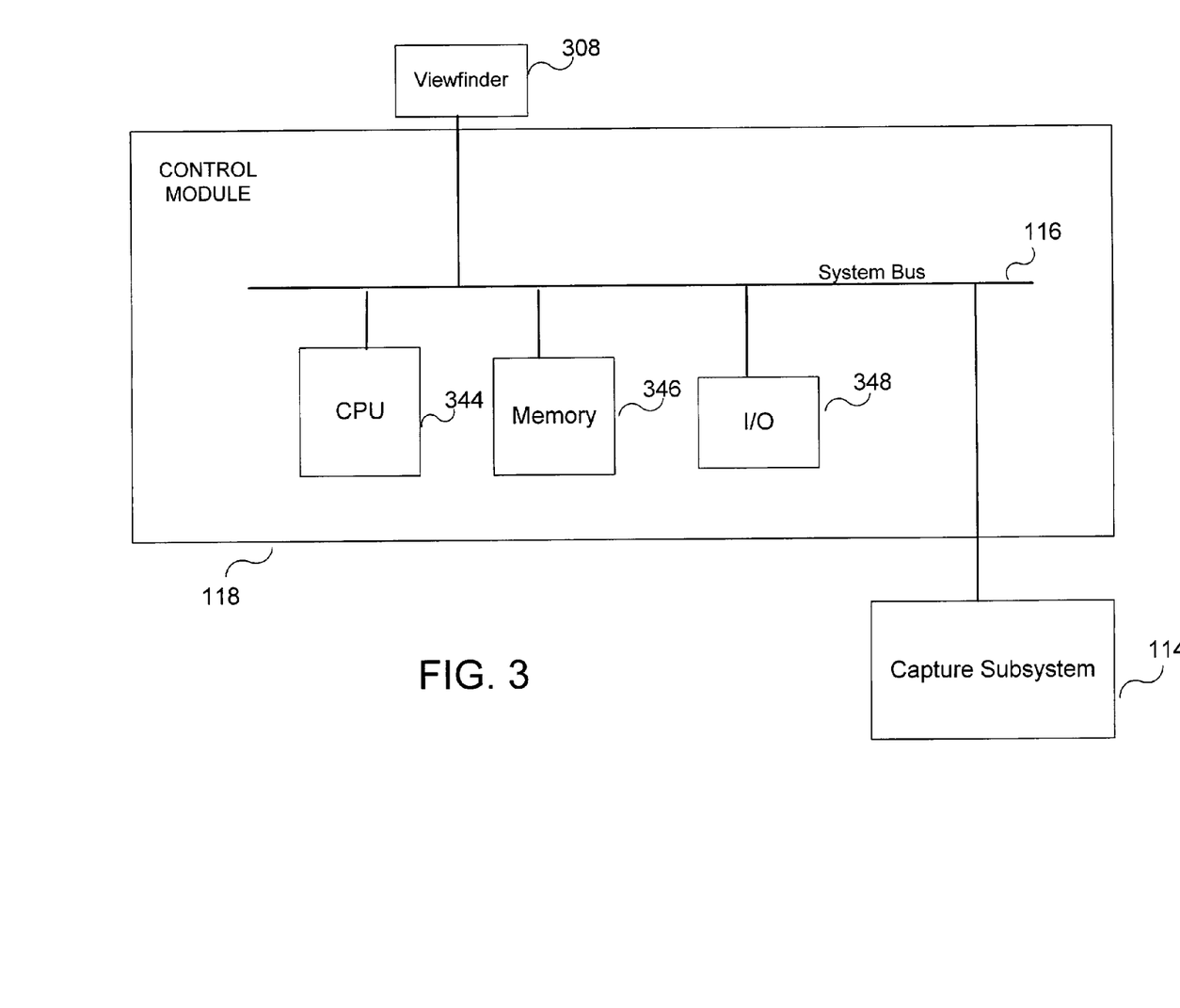
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and one or more input/output interface(s) (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Alternately, CPU 344 may be implemented using any other appropriate technology. For example, CPU 344 may be implemented to include certain digital signal processors (DSPs), application-specific integrated circuits (ASICS), or other appropriate electronic devices. Memory 346 may preferably be implemented as one or more appropriate storage devices, including, but not limited to, read-only memory, random-access memory, and various types of non-volatile memory, such as floppy disc devices, hard disc devices, or flash memory. I/O 348 preferably may provide one or more effective interfaces for facilitating bi-directional communications between camera device 110 and any external entity, including a system user or another electronic device. I/O 348 may be implemented using any appropriate input and/or output devices. The operation and utilization of control module 118 is further discussed below in conjunction with FIGS. 4 through 8.

Figure 4:
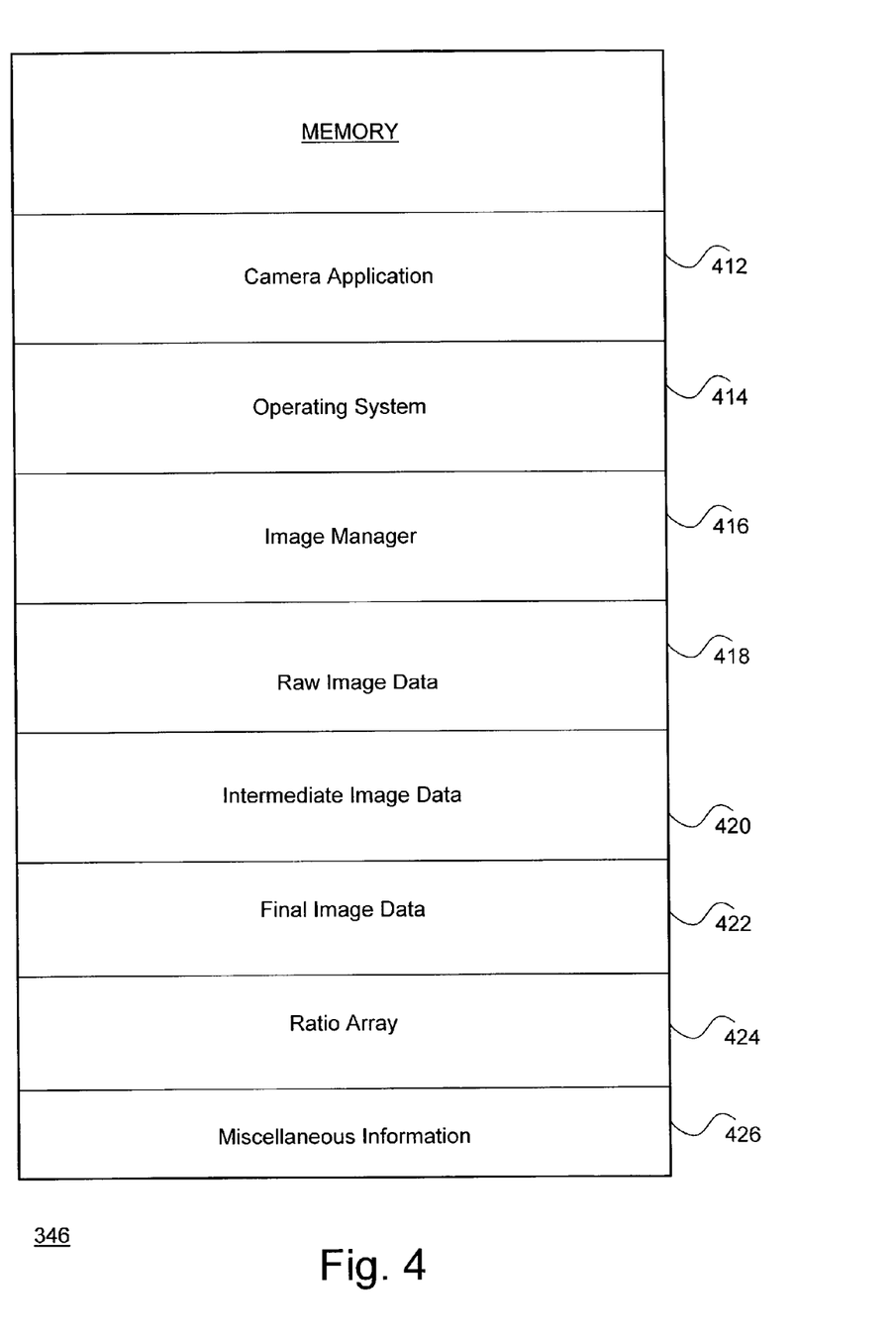
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 may preferably include, but is not limited to, a camera application 412, an operating system 414, an image manager 416, raw image data 418, intermediate image data 420, final image data 422, a ratio array 424, and miscellaneous information 426. In alternate embodiments, memory 346 may readily include various other components in addition to, or instead of, those components discussed in conjunction with the FIG. 4 embodiment.

In the FIG. 4 embodiment, camera application 412 may include program instructions that are preferably executed by CPU 344 (FIG. 3) to perform various functions and operations for camera device 110. The particular nature and functionality of camera application 412 preferably varies depending upon factors such as the type and particular use of the corresponding camera device 110.

In the FIG. 4 embodiment, operating system 414 preferably controls and coordinates low-level functionality of camera device 110. In accordance with the present invention, image manager 416 may preferably control and coordinate an image data processing procedure for processing raw image data 418 captured by camera device 110 to temporarily create intermediate image data 420 which is ultimately transformed into final image data 422 when the foregoing image data processing procedure has been completed. The operation and utilization of image manager 416 is further discussed below in conjunction with FIGS. 5 through 8.

In the FIG. 4 embodiment, ratio array 424 may preferably include color relationship information derived from raw image data 418. For example, in certain embodiments, ratio arrays of R/G and B/G channels are envisioned. The utilization of ratio array 424 is further discussed below in conjunction with FIGS. 7 and 8. Miscellaneous information 426 may include any desired information or data to facilitate functions performed by camera device 110 or image manager 416.

In the FIG. 4 embodiment, the parts of the present invention are disclosed and discussed as being implemented as a group of software modules that are preferably executed by CPU 212 (FIG. 2). However, in alternate embodiments, various portions of the present invention may readily be implemented as appropriate electronic hardware circuits or devices that are configured for performing particular operations that are equivalent to those functions discussed herein in conjunction with the operations of image manager 416.

Figure 5:
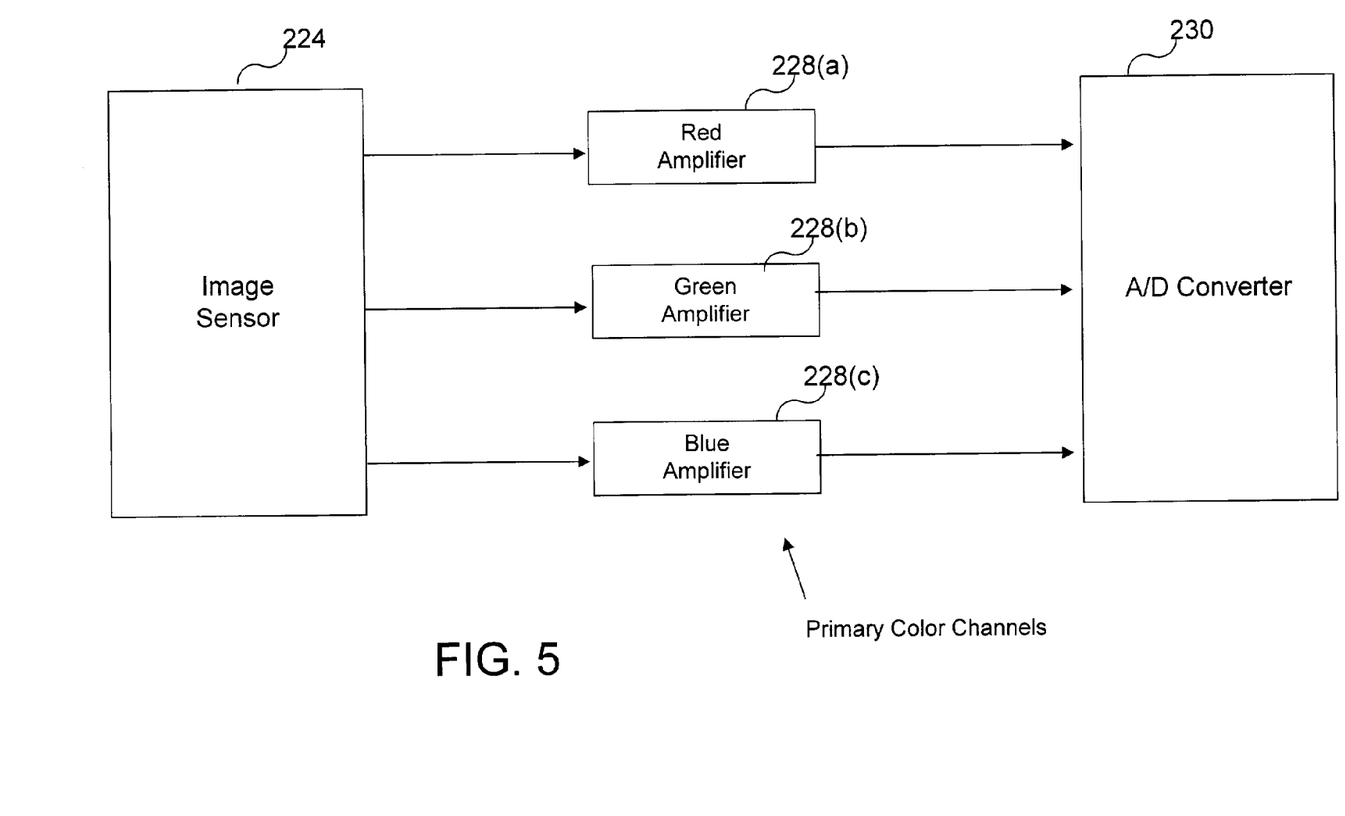
FIG. 5 is a block diagram for one embodiment of the red, green, and blue amplifiers of FIG. 2, in accordance with the present invention.

Referring now to FIG. 5, a block diagram of the FIG. 2 red, green, and blue amplifiers 428 is shown, in accordance with one embodiment of the present invention. In alternate embodiments of the present invention, red, green, and blue amplifiers 428 may readily be implemented to include various other configurations, and may also include various items, colors, and components that are different from those discussed in conjunction with the FIG. 5 embodiment.

In the FIG. 5 embodiment, image sensor 224 may preferably generate a red sensor output to a red amplifier 228(*a*) which may responsively provide an amplified red output to A/D converter 230. Red amplifier 228(*a*) may preferably adjust the signal amplitude of the red sensor output according to a red amplification value referred to herein as red gain. Similarly, image sensor 224 may preferably generate a green sensor output to a green amplifier 228(*b*) which may responsively provide an amplified green output to A/D converter 230. Green amplifier 228(*b*) may preferably adjust the signal amplitude of the green sensor output according to a green amplification value referred to herein as green gain.

In addition, image sensor 224 may preferably generate a blue sensor output to a blue amplifier 228(*c*) which may responsively provide an amplified blue output to A/D converter 230. Blue amplifier 228(*c*) may preferably adjust the signal amplitude of the blue sensor output according to a blue amplification value referred to herein as blue gain. In accordance with the present invention, image sensor 224 may be implemented using any appropriate image capture technology. Camera device 110 may thus adjust respective gains of red, green, and blue amplifiers 428 in order to achieve an appropriate white balance for current lighting conditions when capturing raw image data 418 (FIG. 4).

Figure 6:
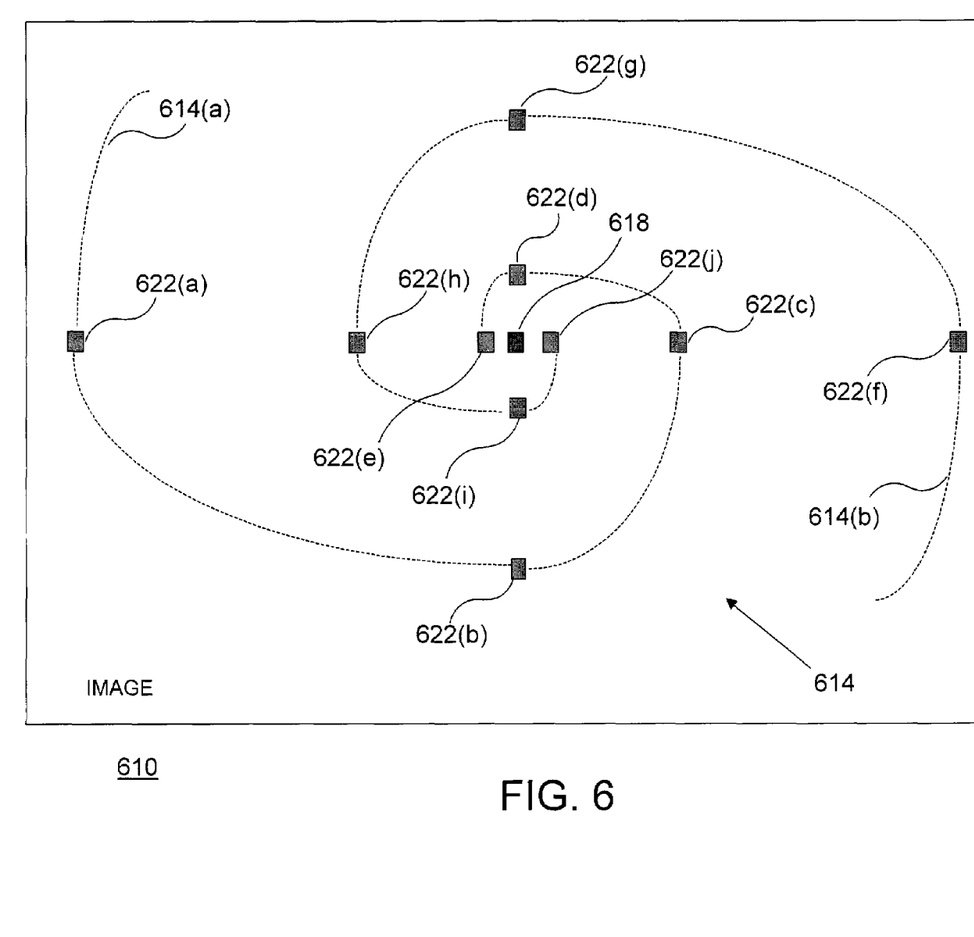
FIG. 6 is a diagram illustrating one embodiment of an image data processing procedure, in accordance with the present invention.

Referring now to FIG. 6, a diagram illustrating one embodiment of an image data processing procedure is shown, in accordance with the present invention. In alternate embodiments, the present invention may readily utilize various items, components, and techniques other than those discussed in conjunction with the FIG. 6 embodiment.

In the FIG. 6 embodiment, the present invention may utilize certain principles of a Retinex theory which proposes that the Human Visual System (HVS) does not use color the way the traditional CIE tri-stimulus response method proposes. Instead, the Retinex theory (derived from retina and the human cortex) depends a great deal on human visual cortex responses to determine what a human being "sees". The fundamental difference between tri-stimulus response and Retinex is that tri-stimulus response proposes that what someone "sees" just comes from a specific pixel and does not depend on the other colored pixels around it.

The Retinex theory claims that the color of a specific pixel is more determined by the brightness levels of the three color channels of all neighboring pixels than just from the specific pixel itself. Retinex theory is discussed in further detail in "Edwin H. Land's Essays", Edwin H. Land, Volume III "Color Vision", edited by Mary McCann, published by IS&T, ISBN:0-89208-170-8, 1993, with is hereby incorporated by reference. Furthermore, at the Eighth Color Imaging Conference in Scottsdale, Ariz., John McCann and Brian Funt presented a paper in which the Retinex algorithm was reduced to standard MATLAB code. The foregoing paper is entitled "Retinex in Matlab", Funt, B. V., Ciurea, F. and McCann, J., Proceedings of the IS&T/SID Eighth Color Imaging Conference: Color Science, Systems and Applications, 2000, pp 112–121, and is hereby incorporated by reference.

The basic operation of the conventional Retinex algorithm proceeds as follows: 1) each color channel (example, red, green, and blue channels each having a range of values from 0.0 to 1.0) is handled separately, 2) an initial state for the final output channel is set to the maximum value of that color channel for every pixel in that channel (this is the initial start up state for what is called the intermediate state storage of the channel which is set to a bright/white state having a value of 1.0), 3) brightness ratios from a given pixel to every neighboring pixel in the original color are computed, 4) a product of the ratios along the path from one pixel to an end point pixel is computed, 5) whenever this intermediate product becomes greater than 1.0 in brightness, the product is subject to a hard reset to 1.0 brightness, and this process continues for all neighboring pixels at a given distance from the destination pixel (see destination pixel 618 of FIG. 6), 6) an average is performed between the intermediate state storage value and the new product along a specific path for each source pixel to this destination pixel.

The foregoing process steps 4) through 6) are repeated for all paths that go from a specific destination pixel to all other source pixels in the image. After the average in step 6) is performed, the result is placed back into the intermediate state storage channel in preparation for other averages that will be computed for other paths to other pixels. When all possible paths to all pixels have been computed, the resulting intermediate state storage for each channel is then expanded (that is arithmetically stretched) so that the entire brightness range (0.0 to 1.0) is populated for this color channel. Then all three channels are joined together to form a final three-color image. The resulting image typically has good white balance properties and the initial wide variations in picture brightness are reduced so that all the pertinent information in the image is readily visible.

In accordance with certain embodiments of the present invention, new mechanisms may be utilized for determining weighting functions for applying to the product of the ratios from item 4 above to more correctly model how the HVS weights the brightness of "far away objects" in the image to the destination pixel. The present invention also teaches how the final optimal processed image may be averaged in with the original image such that very bright objects retain some of their dominance in the image.

In certain embodiments, the present invention may also utilize segmentation operators to limit the distance of paths from a given source pixel to the destination pixel. In the traditional Retinex algorithm, pixels on the extreme left edge must have pathways to pixels on the extreme right hand edge of the image. This involves a large number of products of ratios, and distinctly slows down the speed of the operation. The present invention may use segmentation to determine where large bright objects in each color channel are located. At the transition edge of bright objects, the product of ratios may be halted, thus saving large numbers of unneeded calculations. The present invention may thus both minimize artifacts and speed up processing by decreasing the number of operations. In addition, in certain embodiments, chromatic measurements of bright objects may be made to facilitate retaining some of their original chroma in the optimal processed image.

In the FIG. 6 embodiment, an exemplary image 610 is shown for illustrating an image data processing procedure in accordance with the present invention. The FIG. 6 image 610 preferably includes, but is not limited to, a destination pixel 618 and a dual spiral 614. In the FIG. 6 embodiment, dual spiral 614 preferably includes a first spiral 614(a) and a second spiral 614(b). Furthermore, in the FIG. 6 embodiment, first spiral 614(a) preferably includes source pixels 622(a), 622(b), 622(c), 622(d), and 622(e). In addition, second spiral 614(b) preferably includes source pixels 622 (f), 622(g), 622(h), 622( ), and 622(e). The FIG. 6 diagram of dual spiral 614 is presented for purposes of illustration, and in alternate embodiments, the present invention may readily utilize any other effective curved path that connects source pixels to a destination pixel.

In the FIG. 6 embodiment, image 610 may preferably be initially composed of raw image data 418 that may be processed according to techniques discussed herein before being stored as final image data 422. The FIG. 6 diagram illustrates a single destination pixel 618, however, the processing discussed herein may preferably be performed upon each pixel of image 610 as a separate destination pixel 618 with a separate dual spiral 614 to thereby complete a single iteration of image data processing for image 610.

In the FIG. 6 embodiment, an image manager 416 (FIG. 4) may preferably calculate new destination pixel values for destination pixel 618 by sequentially performing destination pixel calculations based upon source pixels that are located upon first spiral 614(a) and second spiral 614(b). In the FIG. 6 embodiment, image manager 416 preferably performs the foregoing destination pixel calculations with source pixels 622 starting from the most remote source pixel 622 and progressing sequentially to the closest source pixel 622 in relation to destination pixel 618. For example, if image manager 416 began destination pixel calculations with first spiral 614(a), then the destination pixel calculations for first spiral 614(a) would sequential be based upon source pixels 622(a), 622(b), 622(c), 622(d), and 622(e).

In the FIG. 6 embodiment, image manager 416 may perform a basic individual destination pixel calculation by performing a ratio-product-reset-average sequence in which the ratio is a ratio of a source pixel value over the destination pixel value, the product is the foregoing ratio times the current destination pixel value, and the average is an average of the foregoing product and the current destination pixel value held in an intermediate memory. The foregoing reset occurs whenever the foregoing product becomes greater than 1.0 in brightness, in which case the product may be reset to an appropriate alternate value.

The final value of the destination pixel calculation may then preferably be stored as a new destination pixel value for destination pixel 618 in the intermediate memory. Similar destination pixel calculations may sequentially be performed with the remaining source pixels 622 on dual spiral 614. As discussed above, the foregoing process may then be repeated for each pixel in image 610 to complete one iteration of the image data processing procedure to thereby produce corresponding intermediate image data 420. In addition, in accordance with the present invention, image manager 416 may advantageously utilize a number of additional techniques to optimize the foregoing destination pixel calculation. Parallel processing is contemplated in the present invention to achieve optimal processing speed enhancement. The foregoing additional techniques are further discussed below in conjunction with FIGS. 6–8.

In the FIG. 6 embodiment, first spiral 614(a) and second spiral 614(b) each provides a "square spiral" away from each destination pixel 618 to find the ratio-product-reset-average influence of neighboring pixels. In the FIG. 6 embodiment, each successive source pixel 622 is preferably rotated by 90 degrees and is preferably double the distance (rectilinearly) from the influence of the previous neighbor. Dual spiral 614 thus provides a complementary second "square spiral" that balances the first, and reduces artifacts. The second spiral 614(b) is preferably rotated 180 degrees from the first spiral 614(a) and preferably rotates in the same direction.

Therefore, dual spiral 614 provides a double "square spiral" path which can conceptually be envisioned by starting at a destination pixel and moving to neighboring source pixels which spiral outwards to greater distances from the destination pixel. This method of the spiral may be termed "in-to-out". In certain embodiments, dual spiral 614 provides a double "square spiral" path from each destination pixel by going out to the nearest neighbor (a distance of 1 pixel away), then rotating clockwise and going to a distance of 2 pixels, then rotating again, and going to a distance of 4 pixels. The process continues until the doubling of the distance equals the largest power of 2 that fits inside the image (it is actually the largest power of two minus 1). The destination pixel calculation of ratio-product-reset-average mixes together all the image pixels so they have the opportunity to affect destination pixel 618.

Furthermore, in an opposite manner, the first source pixel may be farthest away from the destination pixel, and subsequent source pixels are located along the spiral at gradually smaller distances from the destination pixel until the spiral eventually terminates with a source pixel that is nearest the destination pixel. This method may be termed an "out-to-in" spiral. In the FIG. 6 embodiment, image manager 416 preferably performs the foregoing destination pixel calculations sequentially starting from the largest distance between a source pixel 622 and destination pixel 618, and progresses incrementally inwards to the smallest distance between a source pixel 622 and destination pixel 618.

In certain embodiments of the present invention, a distance weighting factor may advantageously be including by image manager 416 in the foregoing destination pixel calculations. The distance weighting factor advantageously limits the amount of optical reduction that any color channel gets by shutting down the search for neighboring pixels when it has found nearby objects which will stop any need for further optical reduction. One way in which this is accomplished is to use a weighting function that approaches the $Log_{10}$ distance from the destination pixel 618 under consideration to the current product-ratio as it goes along its path.

If just the $Log_{10}$ distance is used without any segmentation limitation, then the weighting factor may preferably be between $Log_{10}$ distance and $1/(distance^{0.1})$ factors. The choice of specific distance weighting factors is image-dependent because of the presence of large bright objects in the various color channels. Image manager 416 may perform regional averaging of the $Log_{10}$ distance and then use the magnitude of the delta in brightness to determine whether $Log_{10}$ distance is to be used (for small brightness differences) or $1/(distance^{0.1})$ factor is needed (for large brightness differences). In certain embodiments, the distance weighting factor thus provides a distance-weighting function for every ratio-product path from a source pixel 622 to a destination pixel 618. The farther the source or "influence" pixel is away from the destination pixel 618, the less the impact of the propagation of ratio-products. The distance weighting factor can vary from a $1/Log_{10}(x)$ factor down to a weighting factor of $x^{-0.4}$ and provide the needed smoothing. Here x is preferably the radial distance from the source pixel 622 to the destination pixel 618.

In certain embodiments of the present invention, image manager 416 may also utilize a relaxed reset technique in the foregoing destination pixel calculations to thereby modify a hard reset to 1.0 when the product ratios exceed 1.0. Image manager 416 may cause a hard reset function to be replaced by a piece-wise smoother function that allows ratio-product propagation to slightly exceed the maximum brightness in each visual channel.

With the relaxed reset technique, the current value along the pixel path may be monitored for each step where products of ratios are performed. In certain embodiments, when image manager 416 identifies that the current product is equal to or greater than 0.90, all further pixel product ratios may be decreased by $1/(distance^{0.1})$ factor to the adjacent pixels when there is a strong brightness change in the local neighborhood. What this amounts to is a discounting of all further brightness influence when locally there is a large brightness change taking place.

The presence of the distance-weighting factor also assists in relaxing the hard reset operation. For bright transitions at large distances, the resulting ratio-product does not exceed unity because the $x^{-0.1}$ factor strongly reduces the influence. For moderately bright transitions at short range to the pixel in question, the $1/Log_{10}(x)$ or $x^{-0.1}$ factors somewhat reduce ratio-products that exceed unity, but do not eliminate them. When such instances are found, the relaxed reset technique preferably applies an accelerated weighting function for the reset. Even when the ratio-product exceeds unity, it is only very slightly larger than 1.0, and the averaging process which follows does not allow the average summed over all "influence" pixels to grow greater than 1.0.

In accordance with the present invention, any effective relaxed reset technique may be utilized. For example, a $Log_{10}$ (exceed+1) may be applied to any ratio-product that exceeds unity. The normalization of the primary color channels may be selected so that R,G,B ranges from zero to one. When a large ratio-product is found, the amount that "exceeds" unity may be converted to logarithmic format and added back to the unity amount. The "exceed+1" argument may be selected so that as "exceed" approaches zero, the amount added back to the unity value also approaches zero. In typical HDR images, the "exceed" amount is small (usually 0.01 or less). However, the slope of $Log_{10}$ just above the abscissa crossing point is fairly steep. This may cause the modified ratio-product-reset-average value to become too large. Consequently, when the "post LUT" expansion (a stretch of the brightness channel to fill the range from 0.0 to 1.0) takes place, the re-normalization may cause the image to become quite dark, even when only a single iteration is used.

To further reduce the influence of the reset process, a division of the $Log_{10}$ (exceed+1) may be performed. For example, a division by 8 may be utilized to provide a smooth contrast transition between closely spaced dark to light transitions, while at the same time providing a good overall average brightness for the image. Other functions with the proper slope when the "exceed" amount is just near zero may be trigonometric and high-rank polynomial functions. In the FIG. 6 embodiment, the $Log_{10}$ (exceed+1)/8 may be utilized, since it can easily be provided by table lookup and arithmetically shifting the result. While the $Log_{10}$ (exceed+1)/8 function has a slope discontinuity with the original ratio-product when "exceed" is zero, it is piece-wise linearly about that point and may be analyzed further by various mathematical expansions.

Therefore, the reset function does not have to be a logical "clamp" to the maximum brightness in each primary channel. While a very strong reduction in any ratio-product which exceeds unity is needed, it is not essential that the residual above the maximum channel brightness be zero. This mimics the induced contrast function of the HVS and appears quite "natural" in the images that have been rendered with the relaxed reset function. "Unsharped masking" is a visual phenomenon in which exaggerated transitions between image edges, which the foregoing relaxed reset technique permits, is a logical outcome of the present invention. It also must be remembered that the distance weighting factor may strongly reduce the large brightness transitions of more distant neighboring pixels.

In certain embodiments of the present invention, image manager 416 may utilize segmentation techniques in image 610 to reduce processing time for the image data processing procedure. Various segmentation techniques may significantly reduce the number of destination pixel calculations by limiting the maximum distance allowed for locating source pixels 622. In certain embodiments, image manager 416 may preferably perform a segmentation algorithm by utilizing an 8-way compass search from the destination pixel 618 out to the farthest source pixel 622 along the path that did not differ within a certain threshold from the brightness of the destination pixel 618.

Due to a combination of the foregoing techniques, the number of iterations required for the image data processing procedure to produce satisfactory images may now advantageously be limited in advance to a relatively small number of iterations. For example, with dual spiral 614, the distance weighting factor, and the relaxed reset techniques, image data 610 may be processed to produce acceptable images with a limit of a single iteration. While a limit of two or more iterations might be desired in certain circumstances to remove certain image details, or under unusual circumstances, a general processing limit may be established requiring only a single iteration for raw image data 418 with a wide range of brightness scale.

The present invention thus improves the smoothness of contrast and accuracy of color rendition in captured image data. The double "square spiral" removes artifacts that use of a single "square spiral" produces. The use of a distance weighting factor provides a solid foundation for seeing details in the shadow regions and allowing a hard reset function to be relaxed. The use of a Log function to handle excess brightness in destination pixel calculations is effective. The reset function may now be piece-wise linear in nature, and may therefore be effectively analyzed by traditional signal processing techniques.

Figure 7:
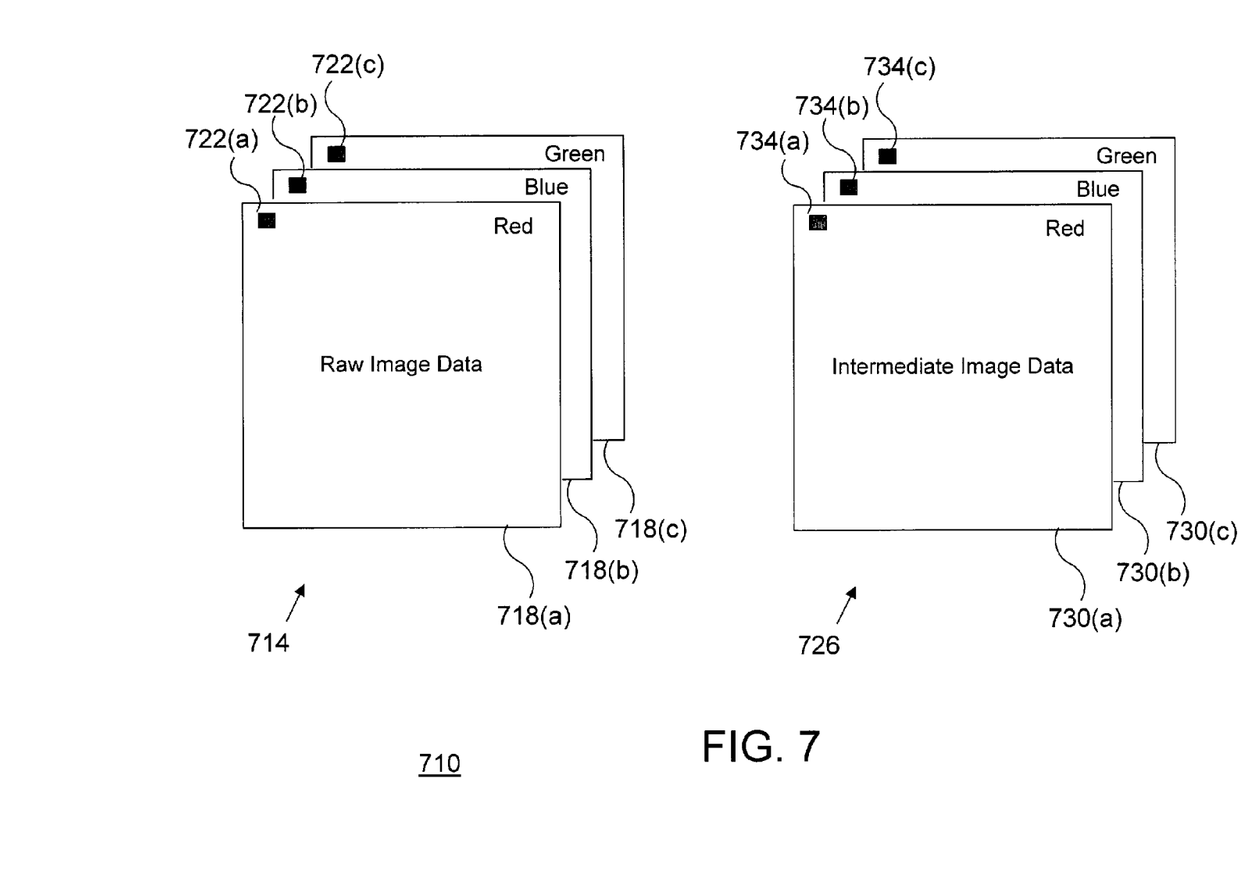
FIG. 7 is a diagram illustrating the utilization of a ratio array, in accordance with one embodiment of the present invention.

Referring now to FIG. 7, a diagram 710 illustrating the utilization of the FIG. 4 ratio array 424 is shown, in accordance with one embodiment of the present invention. In alternate embodiments, the present invention may readily utilize various items, components, and techniques other than those discussed in conjunction with the FIG. 7 embodiment.

In certain embodiments, image manager 416 (FIG. 4) may effectively utilize a ratio array technique to allow color characteristics of a given image to be approximately balanced with the original ratios of the raw image data 418, especially for the bright objects. Image manager 416 may achieve this in any effective manner. For example, image manager 416 may calculate ratios of the color channels in certain areas, such as the bright areas. Once the final "stretch" of the brightness levels is performed, image manager 416 may revisit certain areas, such as high brightness areas, to adjust the chroma of appropriate pixels based upon the ratios of corresponding pixels in raw image data 418. This may have a blending effect to thereby gradually reduce the enhancement of chroma into neighboring low brightness areas. This extension of chroma revitalization may extend into the darker regions based on the dominance of scene chroma and the relative enhancement of the brightness for previously dark objects.

In the FIG. 7 embodiment, diagram 710 includes raw image data 714 with a red channel 718(a), a blue channel 718(b), and a green channel 718(c). Diagram 710 also includes intermediate image data 726 with a red channel 730(a), a blue channel 730(b), and a green channel 730(c). In the FIG. 7 embodiment, intermediate image data 726 preferably corresponds to one iteration of the image data processing procedure discussed above in conjunction with FIG. 6.

In the FIG. 7 embodiment, raw image data 714 may include three similarly-located pixels 722(a), 722(b), and 722(c) that are each located on a different respective one of red (718(a)), blue (718(b)), and green (718(c)) channels. In addition, intermediate image data 726 may include three similarly-located pixels 734(a), 734(b), and 734(c) that are each located on a different respective one of red (730(a)), blue (730(b)), and green (730(c)) channels. In the FIG. 7 embodiment, pixels 734(a), 734(b), and 734(c) from intermediate image data 726 preferably correspond to respective pixels 722(a), 722(b), and 722(c) from raw image data 714, and may be adjusted based upon color ratios between respective pixels 722(a), 722(b), and 722(c) from raw image data 714. In alternate embodiments, ratio array 424 may represent various ratios of pixel content other than color information.

In the FIG. 7 embodiment, while an iteration of intermediate image data 726 is being processed, image manager 416 may concurrently construct a ratio array 424 (FIG. 4). In certain embodiments, image manager 416 may take a ratio for similarly-located pixels 734(a), 734(b), 734(c) from each of the red 730(a), green 730(b), and blue 730(c) primary channels of an iteration of intermediate image data 714 divided by the corresponding pixels (722(a), 722(b), and 722(c)) from the red 718(a), green 718(b), and blue 718(c) primary channels of raw image data 726. The ratio array 424 may preferably represents how much "gain" a particular iteration gave to each pixel (per color) to reduce the dynamic range and bring the details out of the shadows.

Furthermore, as discussed above, in certain embodiments, various types of segmentation operations may be performed upon the foregoing ratio array to find regions and "average gains" of large objects in the image. For example, image manager 416 may utilize a median filter operator working on a 3×3 or a 5×5 kernel around the pixel in question. In accordance with the present invention, when ratio array 424 is multiplied times the intermediate image data 726, the resulting processed image may possess a significantly better white balance than the intermediate image data 726.

In certain embodiments of the present invention, image manager 416 may also effectively perform a final blending procedure upon the processed image data by combining the "range-stretched" processed image data with raw image data 418 times a blending weighting factor. This technique may effectively provide the human visual system (HVS) with some highlight and shadow details, since the HVS puts emphasis on bright objects, which may have limited information, over darker objects that may have large amounts of detail.

The foregoing blending weighting factor may be determined by various methods. For example, image manager 416 may utilize bins to determine how much of the raw image data 418 was brighter than an average of the raw image data 418. The blending weighting factor may be inversely proportional to the amount of bright information compared to the average. So in images with a small bright area, image manager 416 may cause the subtle information in the shadows to dominate at the expense of a few bright areas that do not have large spatial extent. If raw image data 418 has 20–30% of the bright pixels above the average, then image manager 416 may favor the bright sections of the image, and only allow the most dominant parts of the shadows to be visible compared to the highlights. This blending technique may cause the resultant final images to have a more natural appearance.

Figure 8:
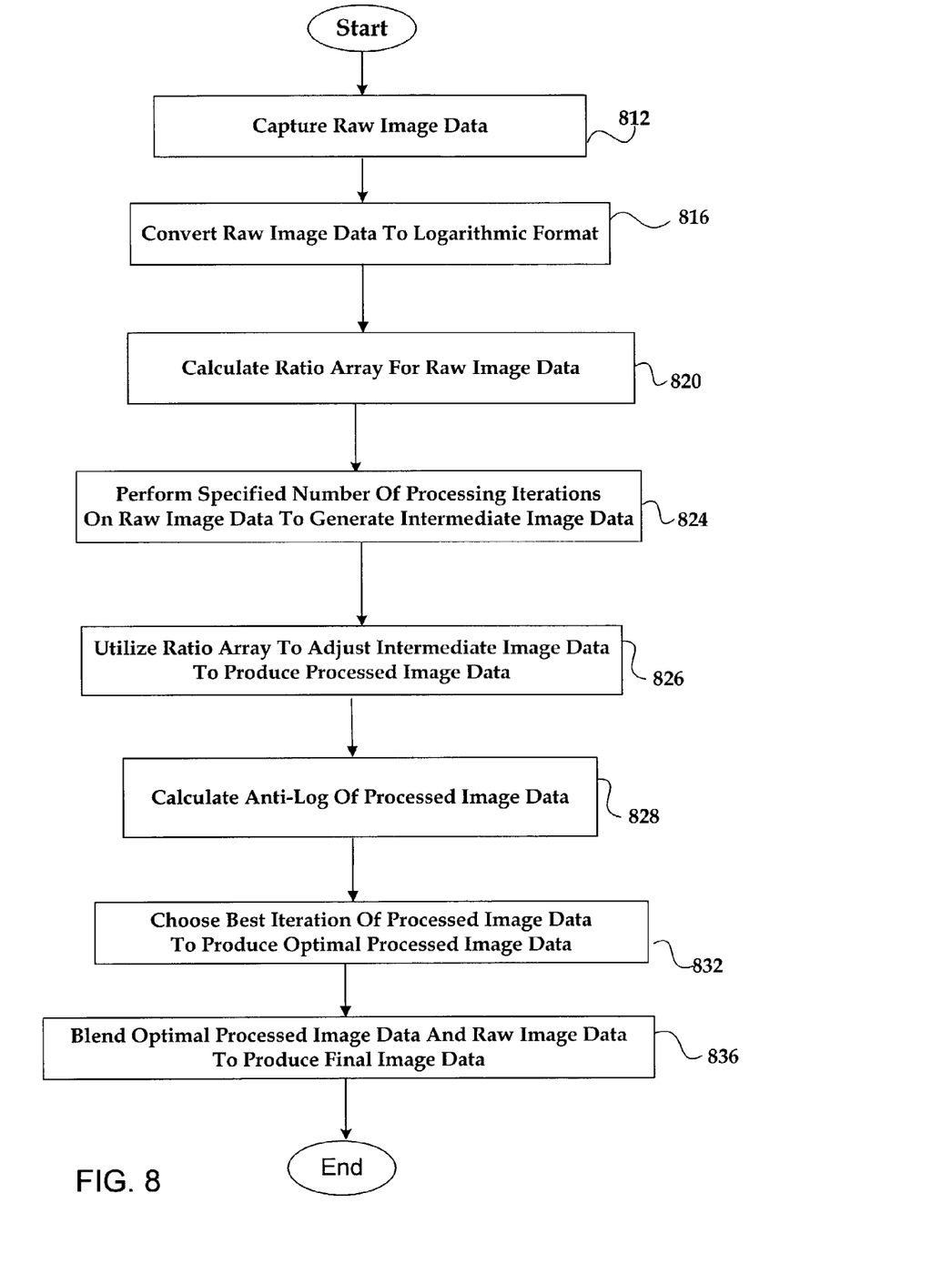
FIG. 8 is a flowchart of method steps for effectively performing an image data processing procedure, in accordance with one embodiment of the present invention.

Referring now to FIG. 8, a flowchart of method steps for effectively performing an image data processing procedure is shown, in accordance with one embodiment of the present invention. The FIG. 8 embodiment is presented for purposes of illustration, and in alternate embodiments, the present invention may readily utilize various other steps and sequences than those discussed in conjunction with the FIG. 8 embodiment.

In the FIG. 8 embodiment, in step 812, a camera device 110 or other appropriate entity may preferably capture raw image data 418 by utilizing any appropriate means or techniques. In certain embodiments, a white balancing process may concurrently be performed by camera device 110, as discussed above in conjunction with FIG. 5. Then, in step 816, an image manager 416 may preferably convert the captured raw image data 418 into logarithmic format to facilitate mathematical calculations during the foregoing image data processing procedure.

Next, in step 820, image manager 416 may preferably calculate a ratio array 424 based upon color characteristics between respective color channels of the captured raw image data 418, as discussed above in conjunction with FIG. 7. In certain embodiments, a segmentation procedure may concurrently be performed by image manager 416, as discussed above in conjunction with FIG. 6.

In accordance with the present invention, in step 824, image manager 416 may preferably perform a specified number of processing iterations on the captured raw image data (in logarithmic format) to thereby generate intermediate image data 420 by utilizing any appropriate techniques. For example, image manager 416 may perform a sequential series of destination pixel calculations for each respective pixel from raw image data 418 to produce an individual iteration. In the FIG. 8 embodiment, image manager 416 may utilize various enhanced techniques to optimize the destination pixel calculation procedure, including a dual spiral technique, a distance weighting factor, a relaxed reset technique, and a fixed iteration limit, as discussed above in conjunction with FIG. 6.

In step 826, image manager 416 may preferably utilize the foregoing ratio array from step 820 to adjust color characteristics of intermediate image data 420 based upon corresponding color characteristics of raw image data 418, to thereby generate processed image data, as discussed above in conjunction with FIG. 7. Then, in step 828, image manager 416 may preferably calculate the anti-log of the processed image data from step 826 to reverse the prior conversion to logarithmic format performed in foregoing step 816.

In step 832, a system user, image manager 416, or any other appropriate entity may preferably choose a best iteration of the processed image data (in non-logarithmic format) by utilizing any effective means, to thereby produce optimal processed image data. Finally, in step 836, image manager 416 may preferably perform a blending procedure to blend the foregoing optimal processed image data with raw image data 418 to thereby produce final image data 422. The FIG. 8 process may then preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image data processing procedure, comprising:

an image manager configured to access raw image data and responsively process said raw image data to produce final image data, said image manager performing destination pixel calculations with raw image data pixels from said raw image data to generate final image pixels for said final image data, said image manager performing said destination pixel calculations by sequentially referencing source pixels located on a dual spiral pattern in said raw image data; and a processor coupled to said image manager for controlling said image manager to thereby perform said image data processing procedure.

2. The system of claim 1 wherein a digital camera device initially captures said raw image data, and subsequently stores said raw image data into a memory device.

3. The system of claim 1 wherein said image manager initially converts said raw image data into a logarithmic format to facilitate mathematical calculations during said image data processing procedure.

4. The system of claim 1 wherein said image manager performs one or more processing iterations by performing said destination pixel calculations for each of said raw image data pixels from said raw image data.

5. A system for performing an image data processing procedure, comprising:

an image manager configured to access raw image data and responsively process said raw image data to produce final image data, said image manager performing destination pixel calculations with raw image data pixels from said raw image data to generate final image pixels for said final image data, said image manager performing one or more processing iterations by performing said destination pixel calculations for each of said raw image data pixels from said raw image data, said image manager performing said destination pixel calculations by sequentially referencing source pixels located on a dual spiral pattern in said raw image data, said image manager performing said destination pixel calculations by sequentially utilizing current values for said destination pixel and individual ones of said source pixels; and a processor coupled to said image manager for controlling said image manager to thereby perform said image data processing procedure.

6. The system of claim 5 wherein said image manager performs said destination pixel calculations in an out-to-in direction by sequentially referencing said source pixels on said dual spiral pattern in an order that begins with a most distant source pixels with relation to said destination pixel, and sequentially proceeds to a closest source pixel with relation to said destination pixel, said image manager implementing each spiral arm of said dual spiral pattern to provide a double square spiral path from said destination pixel by locating said closest source pixel at a first distance of 1 pixel away from said destination pixel, then rotating clockwise to a second distance of 2 pixels for a second source pixel, then rotating again to a third distance of 4 pixels for a third source pixel, said image manager continuing to locate additional ones of said source pixels until doubling of a next distance equals a largest power of 2 minus 1 that fits inside said raw image data.

7. The system of claim 1 wherein said image manager performs said destination pixel calculations to generate intermediate image data by performing a ratio-product-reset-average sequence in which said ratio is calculated by dividing a source pixel value by a destination pixel value, said product being said ratio times said destination pixel value, and said average being a sum of said product and said destination pixel value divided by 2, said reset occurring whenever said product becomes greater than a 1.0 brightness value, in which case said product is reset to a predetermined reset value, said image manager storing a result value from one of said destination pixel calculations as a new destination pixel value for said destination pixel.

8. The system of claim 7 wherein said image manager includes a distance weighting factor in said destination pixel calculations to thereby provide a distance-weighting function to every path distance from one of said source pixels to said destination pixel, so that when said one of said source pixels is more remote with relation to said destination pixel, said destination pixel calculations are then less affected by said one of said source pixels.

9. The system of claim 8 wherein said image manager selects said distance weighting factor from factor values ranging from a $1/\text{Log}_{10}(x)$ distance weighting factor to a $x^{-0.4}$ distance weighting factor, where said x is a radial distance from said one of said source pixels to said destination pixel.

10. The system of claim 7 wherein image manager utilizes a relaxed reset technique in said destination pixel calculations to thereby modify said reset into a smoother piece-wise reset function that allows a ratio-product propagation to slightly exceed a maximum brightness in each visual channel.

11. The system of claim 10 wherein said image manager implements said relaxed reset technique so that a current pixel value along a pixel path is monitored each time said product is calculated, said image manager identifying when said product becomes equal to or greater than 0.90, said image manager responsively decreasing all further calculations of said product by a $1/(distance^{0.1})$ relaxation factor in relation to adjacent pixels when a substantial brightness change is present in neighboring pixels.

12. The system of claim 4 wherein said image manager limits said one or more iterations to a maximum iteration limit by utilizing a dual spiral pattern, a distance weighting factor, and a reset relaxation technique during said destination pixel calculations.

13. The system of claim 1 wherein said image manager utilizes segmentation techniques in said raw image data to thereby reduce processing time for said image data processing procedure, said segmentation techniques limiting a maximum distance allowed for locating source pixels for said destination pixel calculations.

14. The system of claim 7 wherein said image manager utilizes a ratio array technique to impart color characteristics of said raw image data to said intermediate image data, said image manager calculating a ratio array based upon original pixel value ratios of corresponding color channels of said raw image data.

15. The system of claim 14 wherein said image manager applies said ratio array to adjust said intermediate image data to thereby produce processed image data that retains said color characteristics of said raw image data.

16. The system of claim 7 wherein said image manager calculates an anti-log of said processed image data to convert said processed image data into a non-logarithmic format.

17. The system of claim 16 wherein said image manager selects a best iteration of said processed image data to produce optimal processed image data.

18. The system of claim 17 wherein said image manager performs a final blending procedure upon said optimal processed image data by combining said optimal processed image data with said raw image data times a blending weighting factor.

19. The system of claim 18 wherein said blending weighting factor is inversely proportional to a bright image data value compared to an average brightness value.

20. The system of claim 1 wherein said image manager utilizes a dual spiral pattern, a distance weighting factor, a reset relaxation technique, an iteration limit, a ratio array technique, and an image blending technique during said image data processing procedure.

21. A method for performing an image data processing procedure, comprising the steps of:
  accessing raw image data and responsively processing said raw image data with an image manager to produce final image data, said image manager performing destination pixel calculations with raw image data pixels from said raw image data to generate final image pixels for said final image data, said image manager performing said destination pixel calculations by sequentially referencing source pixels located on a dual spiral pattern in said raw image data; and
  controlling said image manager with a processor to thereby perform said image data processing procedure.

22. The method of claim 21 wherein a digital camera device initially captures said raw image data, and subsequently stores said raw image data into a memory device.

23. The method of claim 21 wherein said image manager initially converts said raw image data into a logarithmic format to facilitate mathematical calculations during said image data processing procedure.

24. The method of claim 21 wherein said image manager performs one or more processing iterations by performing said destination pixel calculations for each of said raw image data pixels from said raw image data.

25. A method for performing an image data processing procedure, comprising the steps of:
  accessing raw image data and responsively processing said raw image data with an image manager to produce final image data, said image manager performing destination pixel calculations with raw image data pixels from said raw image data to generate final image pixels for said final image data, said image manager performs one or more processing iterations by performing said destination pixel calculations for each of said raw image data pixels from said raw image data, said image manager performing said destination pixel calculations by sequentially referencing source pixels located on a dual spiral pattern in said raw image data, said image manager performing said destination pixel calculations by sequentially utilizing current values for said destination pixel and individual ones of said source pixels; and
  controlling said image manager with a processor to thereby perform said image data processing procedure.

26. The method of claim 25 wherein said image manager performs said destination pixel calculations in an out-to-in direction by sequentially referencing said source pixels on said dual spiral pattern in an order that begins with a most distant source pixels with relation to said destination pixel, and sequentially proceeds to a closest source pixel with relation to said destination pixel, said image manager implementing each spiral arm of said dual spiral pattern to provide a double square spiral path from said destination pixel by locating said closest source pixel at a first distance of 1 pixel away from said destination pixel, then rotating clockwise to a second distance of 2 pixels for a second source pixel, then rotating again to a third distance of 4 pixels for a third source pixel, said image manager continuing to locate additional ones of said source pixels until doubling of a next distance equals a largest power of 2 minus 1 that fits inside said raw image data.

27. The method of claim 21 wherein said image manager performs said destination pixel calculations to generate intermediate image data by performing a ratio-product-reset-average sequence in which said ratio is calculated by dividing a source pixel value by a destination pixel value, said product being said ratio times said destination pixel value, and said average being a sum of said product and said destination pixel value divided by 2, said reset occurring whenever said product becomes greater than a 1.0 brightness value, in which case said product is reset to a predetermined reset value, said image manager storing a result value from one of said destination pixel calculations as a new destination pixel value for said destination pixel.

28. The method of claim 27 wherein said image manager includes a distance weighting factor in said destination pixel calculations to thereby provide a distance-weighting function to every path distance from one of said source pixels to said destination pixel, so that when said one of said source pixels is more remote with relation to said destination pixel, said destination pixel calculations are then less affected by said one of said source pixels.

29. The method of claim 28 wherein said image manager selects said distance weighting factor from factor values ranging from a $1/\text{Log}_{10}(x)$ distance weighting factor to a $x^{-0.4}$ distance weighting factor, where said x is a radial distance from said one of said source pixels to said destination pixel.

30. The method of claim 27 wherein image manager utilizes a relaxed reset technique in said destination pixel calculations to thereby modify said reset into a smoother piece-wise reset function that allows a ratio-product propagation to slightly exceed a maximum brightness in each visual channel.

31. The method of claim 30 wherein said image manager implements said relaxed reset technique so that a current pixel value along a pixel path is monitored each time said product is calculated, said image manager identifying when said product becomes equal to or greater than 0.90, said image manager responsively decreasing all further calculations of said product by a $1/(\text{distance}^{0.1})$ relaxation factor in relation to adjacent pixels when a substantial brightness change is present in neighboring pixels.

32. The method of claim 24 wherein said image manager limits said one or more iterations to a maximum iteration limit by utilizing a dual spiral pattern, a distance weighting factor, and a reset relaxation technique during said destination pixel calculations.

33. The method of claim 21 wherein said image manager utilizes segmentation techniques in said raw image data to thereby reduce processing time for said image data processing procedure, said segmentation techniques limiting a maximum distance allowed for locating source pixels for said destination pixel calculations.

34. The method of claim 27 wherein said image manager utilizes a ratio array technique to impart color characteristics of said raw image data to said intermediate image data, said image manager calculating a ratio array based upon original pixel value ratios of corresponding color channels of said raw image data.

35. The method of claim 34 wherein said image manager applies said ratio array to adjust said intermediate image data to thereby produce processed image data that retains said color characteristics of said raw image data.

36. The method of claim 27 wherein said image manager calculates an anti-log of said processed image data to convert said processed image data into a non-logarithmic format.

37. The method of claim 36 wherein said image manager selects a best iteration of said processed image data to produce optimal processed image data.

38. The method of claim 37 wherein said image manager performs a final blending procedure upon said optimal processed image data by combining said optimal processed image data with said raw image data times a blending weighting factor.

39. The method of claim 38 wherein said blending weighting factor is inversely proportional to a bright image data value compared to an average brightness value.

40. The method of claim 21 wherein said image manager utilizes a dual spiral pattern, a distance weighting factor, a reset relaxation technique, an iteration limit, a ratio array technique, and an image blending technique during said image data processing procedure.

41. A computer-readable medium comprising program instructions for performing an image data processing procedure by performing the steps of:

accessing raw image data and responsively processing said raw image data with an image manager to produce final image data, said image manager performing destination pixel calculations with raw image data pixels from said raw image data to generate final image pixels for said final image data, said image manager performing said destination pixel calculations by sequentially referencing source pixels located on a dual spiral pattern in said raw image data; and controlling said image manager with a processor to thereby perform said image data processing procedure.

42. A system for performing an image data processing procedure, comprising:

means for accessing raw image data and responsively processing said raw image data to produce final image data, said means for accessing and responsively processing effectively performing destination pixel calculations with raw image data pixels from said raw image data to generate final image pixels for said final image data; and means for controlling said means for accessing and responsively processing to thereby perform said image data processing procedure.

* * * * *